United States Patent Office 3,576,891
Patented Apr. 27, 1971

3,576,891
REMOVAL OF ESTERS AND ACIDS FROM TERTIARY-BUTYL ALCOHOL SOLUTIONS
Rudolph Rosenthal, Broomall, Pa., assignor to Atlantic Richfield Company, Philadelphia, Pa.
No Drawing. Filed Nov. 6, 1967, Ser. No. 681,010
Int. Cl. C07c 29/24; C10e 1/10
U.S. Cl. 260—643                                                5 Claims

ABSTRACT OF THE DISCLOSURE

Method for removing esters and acids from a tertiary-butyl alcohol solution by passing the solution in vapor phase over a supported alkali metal hydroxide catalyst.

BACKGROUND OF THE INVENTION

Field of the invention

This invention relates to a method for utilizing a supported alkali metal hydroxide catalyst to remove esters and acids particularly formic acid and formates from tertiary-butyl alcohol and specifically tertiary-butyl alcohol which has been prepared by the oxidation of isobutane.

Prior art

Winkler et al. 2,845,461 (1958) disclose a method for the noncatalytic liquid phase oxidation of isobutane to produce a mixture of tertiary-butyl hydroperoxide and tertiary-butyl alcohol. The reaction is carried out with a free-oxygen containing gas such as molecular oxygen using reaction temperatures between about 100° C. and 150° C. and pressures above about 400 p.s.i.g.

One of the principal uses of this process is the preparation of the tertiary-butyl hydroperoxide for use as the oxidizing agent in the epoxidation of olefinic compounds. Since, however, the reaction, in general, produces approximately equal amounts of the alcohol and the hydroperoxide it is necessary to find a commercial use for these large quantities of the tertiary-butyl alcohol. It has been found that the tertiary-butyl alcohol can be used as an additive for gasoline since it is particularly effective as an anti-icing additive and also effects some octane improvement. The isobutane oxidation reaction, however, produces in addition to the two main products mentioned small amounts of formic acid and higher acids and in the presence of the alcohol these acids produce the corresponding esters. Thus, in the alcohol there will be found formic acid, tertiary-butyl formate, ethyl formate and the like. In general, none of these compounds are present in excess of about 1 weight percent and more frequently they are present in only a few tenths of a percent. These compounds, however, even in these small amounts are deleterious in gasoline compositions and accordingly it is necessary to remove them prior to the use of the tertiary-butyl alcohol as a gasoline additive.

It has been found that these compounds can be removed by the use of aqueous solutions of sodium hydroxide or calcium hydroxide for example, however, such treatment causes water to become admixed with the tertiary-butyl alcohol and thus there is required some type of drying operation to remove the water from the alcohol after such treatment. No prior art is known, however, which relates to the instant method of using a supported alkali metal hydroxide catalyst to remove in the vapor phase the acids and esters contained in tertiary-butyl alcohol.

SUMMARY OF THE INVENTION

In accordance with this invention tertiary-butyl alcohol particularly as prepared by the oxidation of isobutane and containing minor amounts of acids and esters is passed in vapor phase over a catalyst consisting of an alkali metal hydroxide supported on an inert support material. This treatment substantially completely removes the formic acid and other acids and reduces the ester concentration such as tertiary-butyl formate to concentrations of 100 p.p.m. or less.

It is an object of this invention, therefore, to provide a method for the removal of acids and esters from tertiary-butyl alcohol.

It is another object of this invention to provide a method for the removal of acids and esters from tertiary-butyl alcohol utilizing vapor phase treatment with a supported alkali metal hydroxide catalyst.

It is a specific object of this invention to provide a method of removal of acids and esters from tertiary-butyl alcohol prepared by the oxidation of isobutane by employing a vapor phase treatment over a supported alkali metal hydroxide catalyst.

Other objects of this invention will be apparent from the description of the preferred embodiments which follows and from the claims.

DESCRIPTION OF THE PREFERRED EMBODIMENTS

As has been stated the instant invention is concerned with removal of acids and esters from tertiaryl-butyl alcohol. Specifically, it is concerned with the removal of these compounds from tertiarybutyl alcohol prepared by the oxidation of isobutane for example as described in the aforementioned Winkler et al. patent. In particular it is concerned with the removal of minor amounts of acids and esters of the order of less than about 1 weight percent of each compound in order to provide tertiary-butyl alcohol suitable for use as a gasoline additive.

The catalysts which are suitable for use in this invention are preferably sodium hydroxide and potassium hydroxide. However, the other alkali metal hydroxides are effective but do not possess any particular advantages as far as operability is concerned and are more costly and. accordingly, are less preferred. The alkali metal hydroxide is supported on an inert support such as magnesia. Supports such as alumina, silica-alumina and similar acidic type materials are to be avoided since they will cause rapid dehydration of the tertiary-butyl alcohol. Magnesia is particularly preferred as the support material since it is inert toward the dehydration reaction of the tertiary-butyl alcohol.

The catalyst is prepared by admixing an aqueous solution of the alkali metal hydroxide with the powdered support material, such as powdered magnesia to form a slurry. The slurry is dried and if it forms lumps it is crushed into a powder and then pelleted by conventional means. In general, pellets containing from about 5 weight percent to 30 weight percent alkali metal hydroxide are particularly suitable for use in this invention. Although higher amounts of the alkali metal hydroxide can be used, amounts less than about 5 weight percent are not sufficiently active to be useful. Supported catalysts having from about 7 weight percent to about 20 weight percent alkali metal hydroxide are particularly suitable. Pure solid alkali metal hydroxide pellets are not suitable for use in the invention since they tend to lump together very readily and the bed of pellets becomes impervious to the passage of vapor.

Reaction temperatures of from about 100° C. to about 200° C. can be employed with a somewhat more preferred range being from 120° C. to 160° C.

Liquid hourly space velocities (volume of alcohol charge/volume of catalyst/hour) may range between about 0.5 and 20. The space velocity employed, however, is not particularly critical and in accordance with well-known practice can be varied with the temperature employed. Thus, with temperatures at the higher end of the range, higher space velocities should be employed and conversely, with temperatures at the lower end of the range, lower space velocities should be used. At any particular temperature, decreasing the space velocity increases the severity of the reaction and the conversion and, of course, the converse is likewise true. As has been pointed out it is desirable to eliminate the acids substantially completely and reduce the concentration of such esters as tertiary-butyl formate to the 100 p.p.m. level or below. Accordingly, reaction conditions for any particular alcohol solution should be chosen to produce these results in accordance with the principles which have been set forth above.

A particular advantage of this invention is the fact that the catalyst after it becomes spent with use can be regenerated rather simply by heating it in a stream of air at temperatures of about 400° C. to 500° C. for example, for about an hour. Such treatment regenerates the original activity of the catalyst substantially completely.

The following examples are provided for the purpose of illustrating specific embodiments of the invention, but these examples should not be construed as limiting the invention solely thereto.

EXAMPLE I

A catalyst was prepared by adding 100 ml. of an aqueous solution containing 20 grams of potassium hydroxide to 200 grams of magnesia. After thoroughly slurrying this mixture the slurry was dried at about 130° C., crushed into a powder and pelleted. The catalyst thus prepared contained about 9 weight percent of potassium hydroxide.

A 15 ml. portion of this catalyst was placed in a ½" x 12" Vycor tubular reactor heated by a vertical furnace. A 50-ml. sample of impure tertiary-butyl alcohol soltuion which had been prepared by the liquid phase oxidation of isobutane and contained about 0.4 weight percent formic acid, about 0.3 weight percent tertiary-butyl formate and lesser amounts of other low molecular weight acids and esters was heated to 155° C. in a preheater and passed over the catalyst in a 30-minute period at a temperature ranging between 160° C. and 175° C. The liquid hourly space velocity for this reaction was approximately 6.7. It was found that the effluent from the reactor contained no formic acid, slightly less than about 100 p.p.m. tertiary-butyl formate and substantially no other acid or ester impurities. The original alcohol sample had also contained about 3 weight percent water and this was reduced to 2.37 weight percent. This product was satisfactory for use as a gasoline additive.

EXAMPLE II

Another run was carried out over the same catalyst and in the same manner as utilized in Example I except that a reaction temperature of 121° C. was employed. The results obtained were the same as found for the reaction at the higher temperature of Example I.

EXAMPLE III

A catalyst was prepared by adding 100 ml. of an aqueous solution containing 20 grams of sodium hydroxide to 200 grams of magnesia. The slurry was dried at 130° C., crushed into a powder and pelleted. The catalyst thus prepared contained about 9 weight percent sodium hydroxide.

An 18 ml. portion of this catalyst was placed in the same reaction utilized in Example I and 100 ml. of the impure tertiary-butyl alcohol such as that utilized in Examples I and II was passed over the catalyst at the rate of 20-25 ml. per hour (liquid hourly space velocity of 1.1-1.4) at a temperature of 132° C. The effluent from the reactor contained no formic acid and no tertiary-butyl formate. Additional impure tertiary-butyl alcohol was passed over the catalyst until a total of 360 ml. had been passed over the catalyst. It was found that the final few milliliters of tertiary-butyl alcohol contained about 0.2 weight percent tertiary-butyl formate indicating that the catalyst had become spent.

The catalyst was then heated in a stream of air at 420° C. for one hour. An additional 20-gram sample of the impure tertiary-butyl alcohol was then passed over the catalyst at 132° C. and complete removal of the formic acid and tertiarybutyl formate had been obtained showing that the catalyst had been completely regenerated.

EXAMPLE IV

Another run on the catalyst of Example III with the same impure tertiary-butyl alcohol was carried out at 154° C. and the same results were obtained as in Example III.

EXAMPLE V

Magnesia pellets prepared from the powdered magnesia utilized as the catalyst support in Examples I to IV inclusive in the amount of 40 grams were placed in the reactor and 20 ml. of the impure tertiary-butyl alcohol was passed over the catalyst at a temperature of about 130° C. over a 75-minute period. The recovered tertiary-butyl alcohol solution showed substantially the same tertiary-butyl formate concentration as was contained in the charge alcohol. This run showed that magnesia alone is not a satisfactory catalyst for the process.

As many possible embodiments can be made of this invention without departing from the broad scope thereof, it is to be understood that all matter herein set forth is to be interpreted as illustrative and not as unduly limiting the invention.

I claim:
1. A method for removing esters and acids from tertiary butyl alcohol solutions which comprises passing the tertiary butyl alcohol solution in vapor phase at a temperature from about 100° C. to about 200° C. over a catalyst consisting of about 7 to about 20 weight percent of an alkali metal hydroxide on a magnesia support.
2. The method according to claim 1 wherein the tertiary-butyl alcohol is passed over the catalyst at a temperature in the range of from 120° C. to 160° C.
3. The method according to claim 1 wherein the alkali metal hydroxide is sodium hydroxide.
4. The method according to claim 1 wherein the alkali metal hydroxide is potassium hydroxide.
5. The method according to claim 1 wherein the tertiary butyl alcohol is obtained by the oxidation of isobutane and the alkali metal hydroxide is sodium hydroxide or potassium hydroxide.

References Cited

UNITED STATES PATENTS

| | | | |
|---|---|---|---|
| 2,084,419 | 6/1937 | Wallis et al. | 260—643F |
| 2,615,921 | 10/1952 | Dougherty et al. | 260—632C |
| 2,663,426 | 12/1953 | Wilson et al. | 260—643F |
| 2,696,493 | 12/1954 | Rottig | 260—643E |
| 2,845,461 | 7/1958 | Wrinkler et al. | 260—632C |
| 3,373,180 | 3/1968 | Glass et al. | 260—643F |

FOREIGN PATENTS

| | | | |
|---|---|---|---|
| 23,097 | 6/1930 | Netherlands | 260—643E |
| 213,682 | 6/1941 | Switzerland | 252—475 |
| 591,314 | 8/1947 | Great Britain | 252—475 |

BERNARD HELFIN, Primary Examiner

J. E. EVANS, Assistant Examiner

U.S. Cl. X.R.

44—56; 252—416, 475